United States Patent
Lim et al.

(10) Patent No.: US 10,939,119 B2
(45) Date of Patent: Mar. 2, 2021

(54) METHOD AND APPARATUS FOR ENCODING AND DECODING VIDEO USING SKIP MODE

(71) Applicant: SK TELECOM CO., LTD., Seoul (KR)

(72) Inventors: Jeongyeon Lim, Seongnam-si (KR);
Joong Gunn Park, Suwon Si (KR);
Byeungwoo Jeon, Seongnam-si (KR);
Haekwang Kim, Seoul (KR); Joohee Moon, Seoul (KR); Yunglyul Lee, Seoul (KR); Jongki Han, Seoul (KR);
Jung Youp Yang, Seoul (KR);
Jaehwan Kim, Seoul (KR);
Kwanghyun Won, Bucheon-si (KR);
Hoyoung Lee, Suwon-si (KR)

(73) Assignee: SK TELECOM CO., LTD., Seoul (KR)

( * ) Notice: Subject to any disclaimer, the term of this patent is extended or adjusted under 35 U.S.C. 154(b) by 273 days.

(21) Appl. No.: 14/273,957

(22) Filed: May 9, 2014

(65) Prior Publication Data

US 2014/0307788 A1    Oct. 16, 2014

Related U.S. Application Data

(63) Continuation of application No. PCT/KR2012/009435, filed on Nov. 9, 2012.

(30) Foreign Application Priority Data

Nov. 9, 2011 (KR) .......................... 10-2011-0116686

(51) Int. Cl.
*H04N 19/139* (2014.01)
*H04N 19/61* (2014.01)
(Continued)

(52) U.S. Cl.
CPC ......... *H04N 19/139* (2014.11); *H04N 19/109* (2014.11); *H04N 19/147* (2014.11);
(Continued)

(58) Field of Classification Search
None
See application file for complete search history.

(56) References Cited

U.S. PATENT DOCUMENTS

2006/0039470 A1* 2/2006 Kim ..................... H04N 19/57
  375/240.16
2006/0039476 A1* 2/2006 Watanabe ............ H04N 19/132
  375/240.16

(Continued)

FOREIGN PATENT DOCUMENTS

KR    1020040095398 A    11/2004
KR    10-2010-0122450 A    11/2010

(Continued)

OTHER PUBLICATIONS

Wiegand et al. ("Overview of the H.264/AVC Video Coding Standard" IEEE Trans. Circuits and System for Video Technology. vol. 13, No. 7, Jul. 2003).*

(Continued)

*Primary Examiner* — Kate H Luo
(74) *Attorney, Agent, or Firm* — Hauptman Ham, LLP

(57) ABSTRACT

A video encoding apparatus includes: an inter prediction unit to determine a motion parameter of a current block and generate a predicted block of the current block, by performing a motion estimation on the current block; and an optimal mode determining unit to set a prediction mode of the current block as a SKIP mode when (i) the motion parameter of the current block is identical to a motion parameter of a candidate block among a plurality of candidate blocks and (ii) all-zero coefficients result from a transform and a quan- (Continued)

tization performed on a residual data block representing the difference between the current block and the predicted block.

5 Claims, 8 Drawing Sheets

(51) Int. Cl.
*H04N 19/503* (2014.01)
*H04N 19/52* (2014.01)
*H04N 19/176* (2014.01)
*H04N 19/109* (2014.01)
*H04N 19/147* (2014.01)

(52) U.S. Cl.
CPC ......... *H04N 19/176* (2014.11); *H04N 19/503* (2014.11); *H04N 19/52* (2014.11); *H04N 19/61* (2014.11)

(56) References Cited

U.S. PATENT DOCUMENTS

| | | | | |
|---|---|---|---|---|
| 2008/0002770 A1* | 1/2008 | Ugur | ...................... | H04N 19/51 375/240.16 |
| 2009/0245376 A1* | 10/2009 | Choi | ...................... | H04N 19/52 375/240.16 |
| 2009/0310682 A1* | 12/2009 | Chono | ................. | H04N 19/139 375/240.16 |
| 2010/0020878 A1* | 1/2010 | Liang | ..................... | H04N 19/51 375/240.16 |
| 2010/0054334 A1* | 3/2010 | Yoo | ...................... | H04N 19/176 375/240.14 |
| 2010/0086051 A1* | 4/2010 | Park | ..................... | H04N 19/176 375/240.16 |
| 2010/0239015 A1* | 9/2010 | Wang | ................... | H04N 19/197 375/240.16 |
| 2011/0170593 A1* | 7/2011 | Kim | ..................... | H04N 19/103 375/240.12 |
| 2012/0008676 A1* | 1/2012 | Lee | ...................... | H04N 19/137 375/240.02 |
| 2012/0269269 A1* | 10/2012 | Choi | .................... | H04N 19/597 375/240.16 |
| 2012/0320969 A1* | 12/2012 | Zheng | ................... | H04N 19/40 375/240.02 |
| 2014/0241436 A1* | 8/2014 | Laroche | ................ | H04N 19/52 375/240.16 |

FOREIGN PATENT DOCUMENTS

| | | |
|---|---|---|
| KR | 1020110054592 A | 5/2011 |
| KR | 1020110066888 A | 6/2011 |
| WO | 2010131903 A3 | 11/2010 |

OTHER PUBLICATIONS

Pan et al. ("Fast Mode decision algorithms for inter/intra Predition in H.264 video coding" Advances in Multimedia information processing PCM 2007.).*
ITU-T H.264 (Mar. 2010).*
Jeon et al. ("Fast mode decision for H.264" JVT of ISO/IEC MPEG & ITU-T VCEG Dec. 2003).*
Wiegand et al. ("Overview of the H.264/AVC Video Coding Standard" IEEE Trans. Circuits and System for Video Technology. vol. 13, No. 7, Jul. 2003) (Year: 2003).*
ITU-T H.264 (Mar. 2010) (Year: 2010).*
International Search Report dated Feb. 27, 2013 for PCT/KR2012/009435, citing the above reference(s).
Korean Office Action dated Aug. 16, 2017 for corresponding Korean Application No. 10-2011-0116686, citing the above references.

* cited by examiner

METHOD AND APPARATUS FOR ENCODING AND DECODING VIDEO USING SKIP MODE

CROSS-REFERENCE TO RELATED APPLICATION

The present application is a continuation of International Patent Application No. PCT/KR2012/009435, filed Nov. 9, 2012, which claims priority to Korean Patent Application No. 10-2011-0116686 filed on Nov. 9, 2011. The Korean Patent Application No. 10-2011-0116686 is incorporated herein by reference in its entirety.

FIELD

The present disclosure in one or more embodiments relates to a method and an apparatus for encoding and decoding a video with a SKIP coding mode.

BACKGROUND

The statements in this section merely provide background information related to the present disclosure and does not constitute prior art.

Encoding and decoding a video according to the known standard of H.264/AVC includes partitioning a single picture into a plurality of macroblocks. Each macroblock has a fixed size of 16×16 pixels. The respective macroblocks are coded in all the available coding modes using inter prediction method (called inter prediction modes) and all the available coding modes using inter prediction method (called inter prediction modes), and then a single optimal coding mode satisfying a predetermined criterion is determined, in order to carry out the video encoding and decoding operations by using the determined optimal coding mode. In this case, the predetermined criterion used in the H.264/AVC standard is rate-distortion (R-D) optimization criterion. Therefore, the inventor(s) has noted that the single optimal mode is determined by considering together the bit rate required to encode each macroblock and the degree of distortion between the original macroblock and reconstructed macroblock.

The intra prediction mode is used in intra prediction method. The inventor(s) has noted that to encode the macroblock of the current picture, the intra prediction method does not refer to a reference picture but predicts a predicted value of the macroblock first to encode by using values of pixels spatially adjacent to the target macroblock and then encode the difference between the predicted pixel values and the macroblock. Multiple intra prediction modes are presented depending on the directions of the intra prediction. Referring to the drawings, the H.264/AVC standard uses nine directional intra prediction modes as with 4×4 intra block and 8×8 intra block in FIG. 1A and four intra prediction modes as with 16×16 intra block in FIG. 1B.

The inter prediction mode is used in inter prediction method. To encode the macroblock of the current picture, the inter prediction method encodes motion information (e.g. motion vector, reference picture index, etc.) representative of one or a plurality of blocks selected from the reference picture and the differences between predicted pixel values generated by using the motion information and the macroblock. The inventor(s) has noted that the H.264/AVC standard has up to five reference pictures and they can be previous pictures or subsequent pictures of the current picture. Depending on the ways of partitioning the macroblock to perform the motion prediction and compensation, a variety of prediction modes exist. As shown in FIG. 2, the H.264/AVC standard uses five inter prediction modes of SKIP, P16×16, P16×8, P8×16 and P8×8. The P8×8 mode is subdivided into four prediction modes of P8×8, P16×8, P8×16 and P8×8 applicable to subblocks.

Thus, determining the optimal mode among the plurality of intra prediction modes and the plurality of inter prediction modes is a factor that determines the video coding performance. As described above, the known H.264/AVC standard takes all the available intra prediction modes and inter prediction modes for calculating their rate-distortion costs to select the mode with the lowest cost as the optimal prediction mode. However, the inventor(s) has experienced that such optimal mode decision process requires very high complexity. Further, the inventor(s) has noted that the more intra prediction modes and inter prediction modes are used in order to achieve higher coding performance, the higher the complexity of the optimal mode decision process becomes. However, the inventor(s) has experienced that using the SKIP among the coding modes make the encoding and decoding processes simpler, and when it is simple to know whether encoding given image data in SKIP mode is appropriate, the amount of calculation is reduced while preventing degradation of the coding performance. Therefore, the inventor(s) has noted that encoding and decoding the video using the SKIP mode is a technical challenge.

SUMMARY

In accordance with at least one embodiment of the present disclosure, a video encoding apparatus comprises an inter prediction unit and an optimal mode determining unit. The inter prediction unit is configured to determine a motion parameter of a current block and generate a predicted block of the current block, by performing a motion estimation on the current block. And the optimal mode determining unit is configured to set a prediction mode of the current block as a SKIP mode when (i) the motion parameter of the current block is identical to a motion parameter of a candidate block among a plurality of candidate blocks and (ii) all-zero coefficients result from a transform and a quantization performed on a residual data block representing the difference between the current block and the predicted block.

In accordance with at least one embodiment of the present disclosure, a video encoding apparatus comprises an inter prediction unit and an optimal mode determining unit. The inter prediction unit is configured to generate a predicted block of a current block with a motion compensation performed by using a motion parameter of a single block from candidate blocks among neighboring blocks of the current block. And the optimal mode determining unit is configured to set a prediction mode of the current block as a SKIP mode when all-zero coefficients result from a transform and a quantization performed on a residual data block representing the difference between the current block and the predicted block.

In accordance with yet another embodiment of the present disclosure, a video decoding apparatus mat be configured to extract prediction mode information from a bitstream, reconstruct, as a current block, a block that is indicated by a motion parameter generated from extracting motion parameter identification information when the extracted prediction mode information is a SKIP mode, and predictively encode the current block by generating a predicted block based on the extracted prediction mode information when the extracted prediction mode information is not the SKIP mode.

In accordance with at least one embodiment of the present disclosure, a video decoding apparatus comprises a bitstream decoder and a prediction unit. The bitstream decoder is configured to extract prediction mode information and motion parameter identification information from a bitstream. And the prediction unit is configured to reconstruct a current block by using a block that is indicated by a motion parameter generated by using the motion parameter identification information when the extracted prediction mode information is indicative of a SKIP mode, and generate a predicted block for the current block based on the extracted prediction information when the extracted prediction mode information is not indicative of the SKIP mode.

In accordance with at least one embodiment of the present disclosure, video decoding apparatus is configured to extract prediction mode information and motion parameter identification information from a bitstream; reconstruct a current block by using a block that is indicated by a motion parameter generated by using the motion parameter identification information when the extracted prediction mode information is indicative of a SKIP mode; and generate a predicted block for the current block based on the extracted prediction information when the extracted prediction mode information is not indicative of the SKIP mode.

DETAILED DESCRIPTION

Figure 1A:
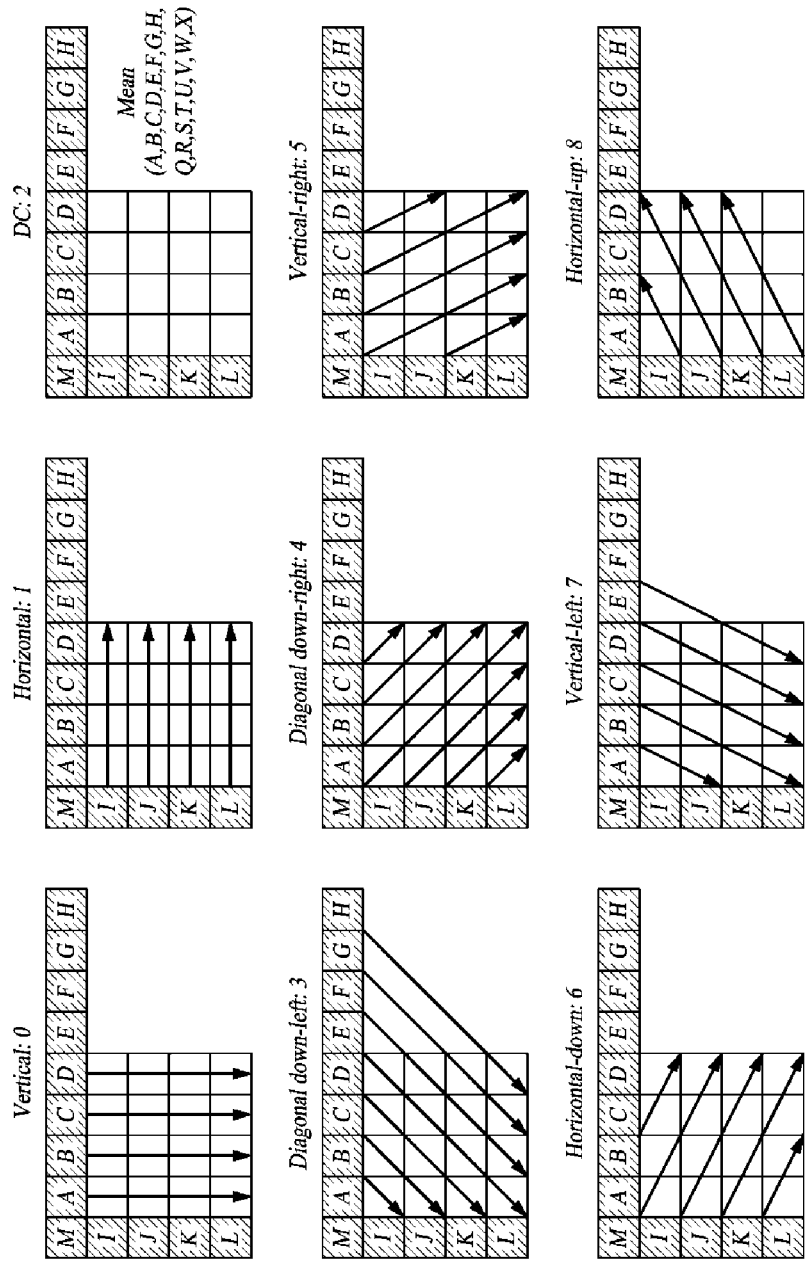
FIGS. 1A and 1B respectively are diagrams of nine directional intra prediction modes (4×4 and 8×8 intra blocks) and four intra prediction modes (16×16 intra block) in the H.264/AVC standard.

Hereinafter, the present disclosure will be described in detail with some embodiments thereof referring to the accompanying drawings.

In the following description, a video encoding apparatus and/or a video decoding apparatus according to one or more embodiments correspond to a user terminal such as a PC (personal computer), notebook computer, PDA (personal digital assistant), PMP (portable multimedia player), PSP (PlayStation Portable), wireless terminal, smart phone, TV and the like. A video encoding apparatus and/or a video decoding apparatus according to one or more embodiments correspond to a server terminal such as an application server, service server and the like. A video encoding apparatus and/or a video decoding apparatus according to one or more embodiments correspond to various apparatuses each including (a) a communication apparatus such as a communication modem and the like for performing communication with various types of devices or a wired/wireless communication networks, (b) a memory for storing various programs and data that encode or decode a video or perform an inter/intra prediction for encoding or decoding, and (c) a microprocessor to execute a program so as to perform calculation and controlling, and the like.

Further, a video encoded into a bitstream by the video encoding apparatus is transmitted in real time or non-real-time to the video decoding apparatus through wired/wireless communication networks such as the Internet, wireless personal area network (WPAN), wireless local area network (WLAN), WiBro (wireless broadband, aka WiMax) network, mobile communication network and the like or through various communication interfaces such as a cable, a universal serial bus (USB) and the like. According to one or more embodiments, the bitstream is decoded in the video decoding apparatus and is reconstructed to a video, and the video is played back.

In general, a video is formed of a series of pictures (also referred to herein as "images" or "frames"), and each picture is divided into predetermined regions such as blocks. The divided blocks are classified into an intra block or an inter block depending on an encoding scheme. The intra block refers to a block that is encoded based on an intra prediction coding scheme. The intra prediction coding scheme predicts pixels of a current block by using pixels of blocks that were previously encoded and decoded to be reconstructed in a current picture to which encoding is to be performed, so as to generate a predicted block, and encodes pixel differences between the predicted block and the current block. The inter block means a block that is encoded based on an inter prediction coding scheme. The inter prediction encoding scheme predicts a current block in a current picture referring to at least one previous picture and/or at least one subsequent picture, so as to generate a predicted block, and encodes differences between the predicted block and the current block. Here, a frame that is referred to in encoding or decoding the current picture (i.e., current frame) is called a reference frame.

Figure 3:
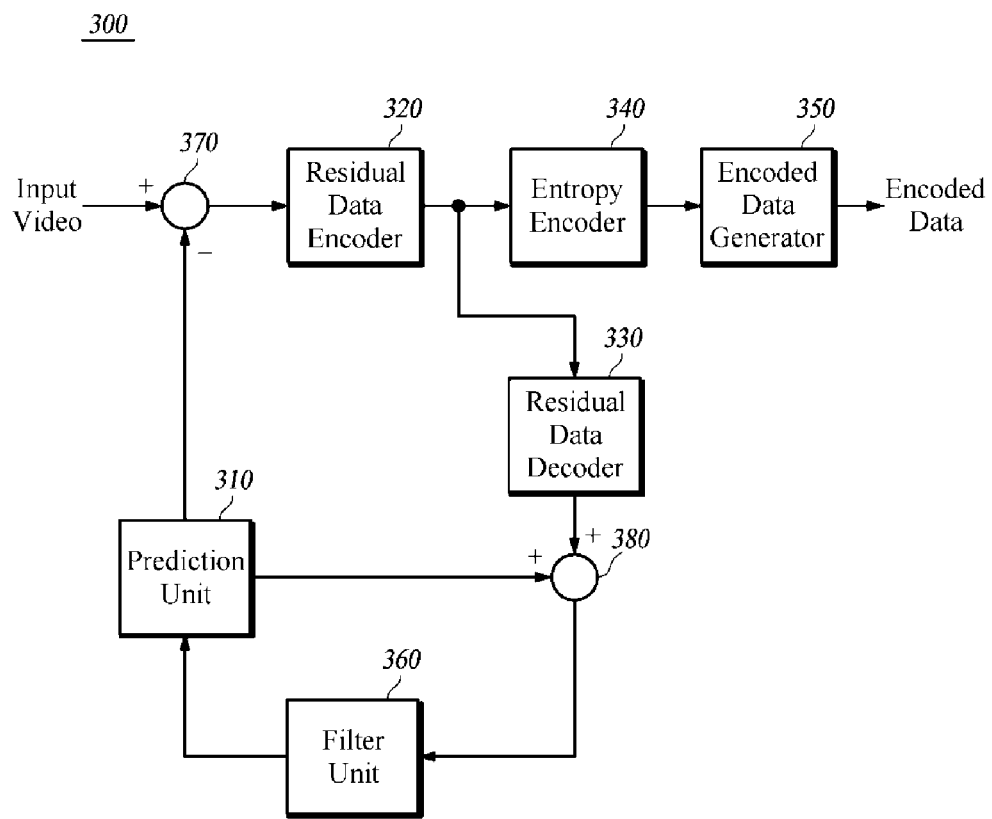
FIG. 3 is a block diagram of a video encoding apparatus to which a fast mode decision apparatus is applied according to at least one embodiment.
Figure 4:
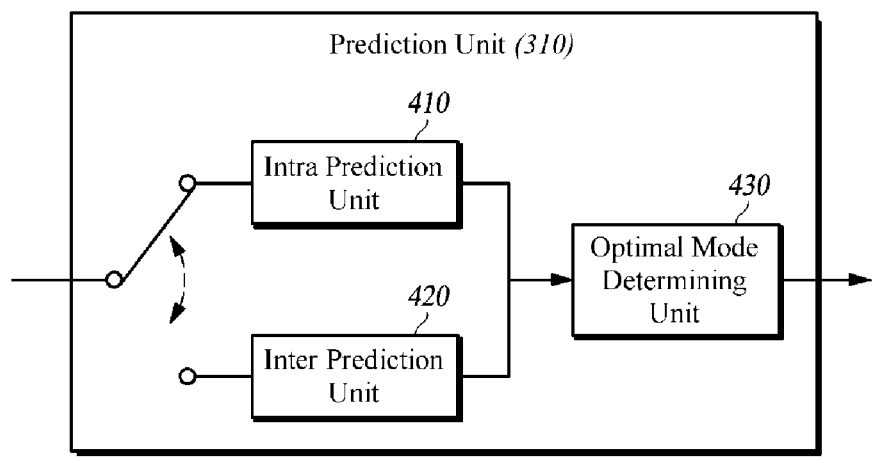
FIG. 4 is a schematic diagram of a prediction unit according to at least one embodiment.

FIG. 3 is a block diagram of a video encoding apparatus 300 to which a fast mode decision apparatus is applied according to an aspect of the present disclosure. Referring to FIG. 3, video encoding apparatus 300 with the applied fast mode decision apparatus of this aspect includes a predictor 310, a residual data encoder 320, a residual data decoder 330, an entropy encoder 340, encoded data generator 350, an in-loop filter 360, a subtractor 370 and an adder 380.

The video to be encoded is entered in blocks of a predetermined size which is, for example, 16×16 type of macroblock type in the known case of H.264/AVC standard. For the sake of convenience, some embodiments of the present disclosure define blocks as 2N×2N type as in the H.264/AVC standard, though the blocks is of 2M×2N type more generally wherein M and N are respectively equal to or more than 8 in particular and are integers equal to or different from each other. In addition, the input block of size 2N×2N is subdivided into lower input blocks of size N×N.

Prediction unit 310 generates a predetermined size of the predicted block of the current block. In other words, by predicting the current block with intra prediction or inter prediction or the like, the prediction unit 310 generates a predicted block having predicted pixel values as its pixel values. Subtractor 370 subtracts the predicted block generated with the intra prediction or inter prediction or the like from the current block in order to generate residual data block. In other words, subtractor 370 provides residual data encoder 320 with the residual data block generated having residual data which is generated by calculating differences between the original pixel values of the respective pixels of the current block and the predicted pixels values of the respective pixels of the predicted block.

To this end, prediction unit 310 is configured to include an intra prediction unit 410, an inter prediction unit 420 and an optimal mode determining unit 430. Intra prediction unit 410 generates predicted blocks with all the intra prediction modes that the current block can have, and inter prediction unit 420 generates the predicted blocks with all the inter prediction modes that the current block can have. For each of all the intra prediction modes and inter prediction modes that can be generated by intra prediction unit 410 and inter prediction unit 420, optimal mode determining unit 430 calculates the corresponding rate-distortion cost and determines the mode with the lowest cost as the optimal prediction mode.

Figure 1B:
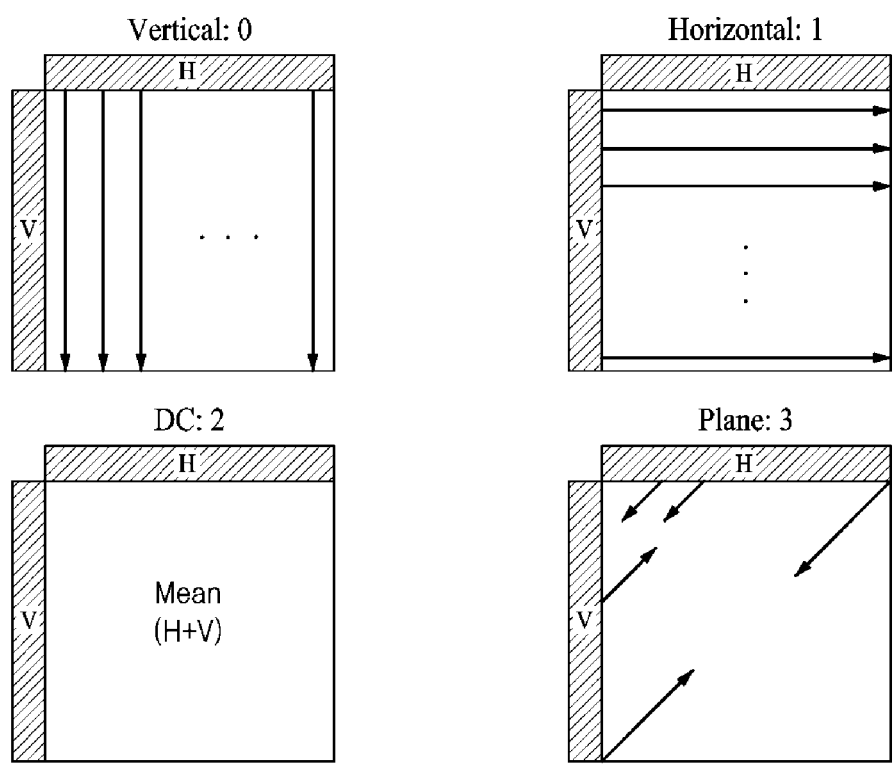

Intra prediction unit 410 generates an intra prediction block of the current block by using the current block and its closely neighboring blocks with available pixel values. Although one embodiment of the present disclosure is as shown in FIG. 1 having nine directional intra prediction modes (in case of N/2×N/2, N×N intra blocks) and four intra prediction modes (in case of 2N×2N intra blocks), the intra prediction modes are defined in more diverse ways. For example, with 2M×2N form of intra prediction modes, a combination of K directional intra prediction modes and L non-directional intra prediction modes combined is used. In particular, M and N are 8 or greater or smaller than 8 with M and N being the same integer or different integers from each other. Further, different number K or L of intra prediction modes is used depending on the size of the intra blocks.

With respect to the current block and all of its temporally neighboring (previous, current or subsequent) reference pictures available for use, inter prediction unit 420 calculates error values between the respective inter prediction blocks and the current block, and generates the inter prediction block of the current block through the inter prediction block of the reference picture with a minimum error value. In this case, inter prediction unit 420 estimates motion vector based on the location of the inter prediction block with the minimum error value between the current block. In particular, when rate-distortion optimization criteria have been applied to the motion estimation process, the inter prediction blocks are determined in consideration of not only the error values between the inter prediction blocks and the current block but also the amount of bits involved in encoding motion information (motion vectors, reference picture indices, etc.).

In particular, in order to minimize the amount of bits required for the motion information, the known H.264/AVC standard determines a single predictive motion vector (PMV) by using a median value among motion vectors of the neighboring blocks, uses the PMV as the predicted value of the current motion vector and transmits or stores only the differential motion vector. Therefore, the coding efficiency is efficiently achieved by reducing the amount of the motion information (differential motion vectors, reference picture indices, etc.). For the purpose of more general illustration, one exemplary embodiment of the present disclosure presents a method for determining an optimal predictive motion vector singled from a plurality of candidate predictive motion vector. In this case, a predictive motion vector index is transmitted together or stored in order to express which candidate predictive motion vector is being used. This means that, in the process of motion estimation, consideration is made to the required bits for encoding the motion information including the predictive motion vector index, differential motion vectors and reference picture indices.

Figure 2:
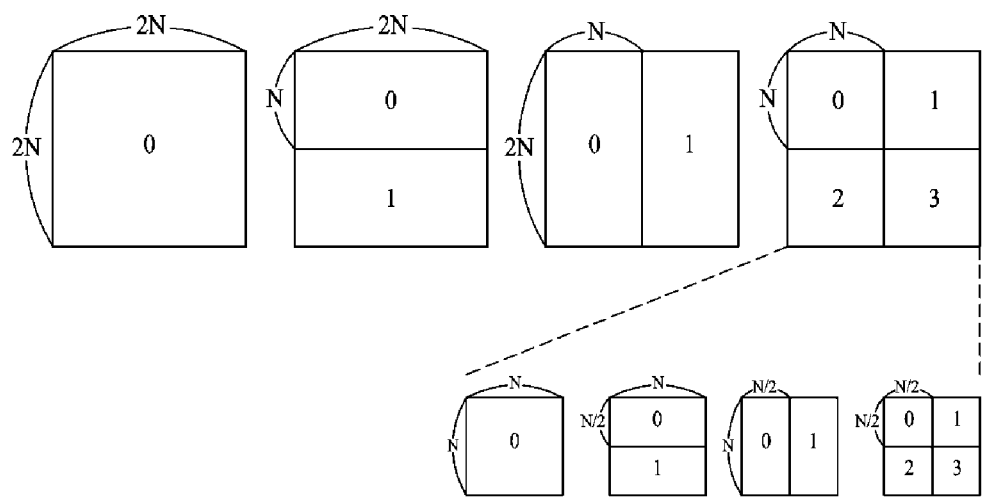
FIG. 2 is diagram of the H.264/AVC standard using five inter prediction modes of SKIP, P16×16, P16×8, P8×16 and P8×8.

One embodiment of the present disclosure is as shown in FIG. 2 illustrating the H.264/AVC standard with five inter prediction modes (SKIP, P2N×2N, P2N×N, PN×2N and PN×N), although they can be defined in a wider variety of methods. For example, various other inter prediction modes are added such as 2M×N/2, M/2×2N.

Optimal mode determining unit 430 calculates the rate-distortion costs for all the available intra prediction modes and inter prediction modes of the current block generated through intra prediction unit 410 and inter prediction unit 420, and determines the mode with the lowest cost as the optimal prediction mode of the current block mode. In one embodiment of the present disclosure, a predetermined optimal decision criterion is exemplified for a common method for rate-distortion optimization but various decision criteria is applied in more general implementations. For example, the distortion is applied as the decision criteria depending on embodiments. Further, some embodiments let the optimal prediction mode of the current block to be determined by forgoing calculating the rate-distortion costs with respect to all the respective intra prediction modes and/or inter prediction modes that are available to the current block.

However, as described above, calculating the respective rate-distortion costs of all the current block's available intra prediction modes and/or inter prediction modes involves very high complexity. Therefore, the present disclosure in some embodiments provides optimal mode determining unit 430 adapted to perform (a) when it is needed to determine an optimal mode of predetermined size of blocks that can have multiple intra and inter prediction modes, determining whether a block satisfies predetermined conditions positively corresponding to a first mode; and (b) when the conditions for the first mode are met, determining the first mode as an optimal mode of the block and encoding the block with the determined first mode. In other words, optimal mode determining unit 430 in some embodiments forgoes calculating the respective rate-distortion costs of all of the current block's available intra and inter prediction modes and preferentially determines whether the predetermined conditions for the first mode is satisfied. When the current block satisfies the conditions for the first mode, optimal mode determining unit 430 forgoes calculating the rate-distortion costs of all the prediction modes but the first mode to determine the first mode as the optimal prediction mode of the block. If the current block does not satisfy the conditions for the first mode, determining unit 430 performs calculating the rate-distortion costs of all the prediction modes and determines the mode with the lowest rate-distortion cost as the optimal prediction mode of the block.

According to some embodiments of the present disclosure, the predetermined conditions positively corresponding to the first mode are (a) the block sizes for motion prediction and compensation being of a coding unit such as 2N×2N (i.e. P2N×2N mode), (b) the motion vector and reference picture index of the current block respectively corresponding to those of one of a plurality of candidate blocks and (c) all-zero coefficients resulting from transforming and quantizing the residual data block between the predetermined input block and the predicted block. That is, when the all-zero coefficients result from the transform and the quantization performed on the residual data block, the optimal mode determining unit sets the prediction mode of the current block as the SKIP mode without comparing costs of encoding the current block for other prediction modes other than the SKIP mode.

The first mode is SKIP mode for transmitting or storing only the coding mode information of the input block. Different from the known SKIP mode that transmits or stores only the coding mode information of the input block, the present disclosure in some embodiments has temporally and spatially adjacent multiple candidate neighboring blocks' motion parameters (motion vector and reference picture index) to single out a predictive motion parameter, and in response, it further transmits or stores candidate block index information for enabling identification of the candidate block with a predictive motion parameter selected.

Figure 5:
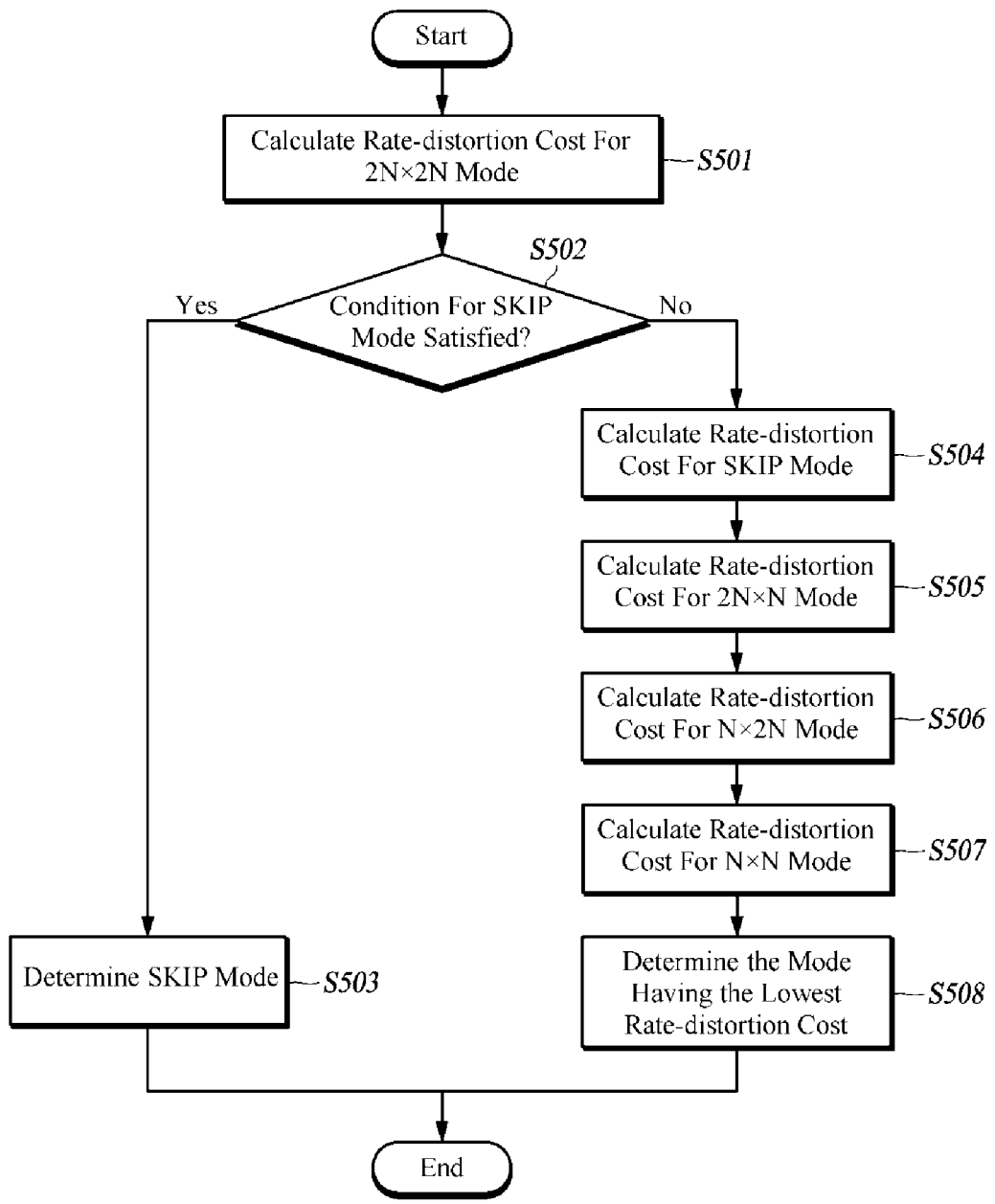
FIG. 5 is a flowchart of a fast mode decision method according to at least one embodiment.

FIG. 5 is a flowchart of the high-speed mode determining method described above according to at least one embodiment of the present disclosure.

As shown in FIG. 5, upon receipt of the current block of 2N×2N form, a preferential check is made for whether the input current block can be determined early as assuming SKIP mode based on the predetermined condition. As described above, the SKIP mode is adapted to store or transmit to a video decoding apparatus, only the coding mode information of the input current block and if needed, the SKIP mode is adapted to transmit an additional neighboring block index, representing a candidate block among multiple candidate neighboring blocks, as the identifying information for the motion parameter to make a residual motion vector zero. This is appropriate with a background portion of the video or such which is highly probable to have given blocks of the current picture being equally pixelated to the corresponding reference blocks of the reference picture, in which case it is not necessary to transmit or store extra encoded information such as residual data or motion vector information but transmitting or storing just the coding mode information (and/or neighboring block indexes).

In order to check the possibility of an early determination of an encoded mode as the SKIP mode, this embodiment performs motion prediction on P2N×2N mode of the current block, and then determines motion vectors, predictive motion vector indexes and reference picture indexes in step S501. During the aforementioned motion estimation, applying a rate-distortion optimization is as in Equation 1.

$$(pmv, dmv) = \operatorname*{argmin}_{dmv_i \in SR} \{\operatorname*{argmin}_{pmv_j \in CS} J(pmv_j, dmv_i)\}$$

$$J(pmv_j, dmv_i) = D(pmv_j + dmv_i) + \lambda \left\{ \begin{array}{l} R_{dmv}(dmv_i) + \\ R_{pmv}(pmv_j) \end{array} \right\}$$

Equation 1

In Equation 1, J and D respectively refer to a rate-distortion optimization function and a function of distortion. $R_{dmv}$ is a measurement function of the amount of bits needed to encode the differential motion vector dmv, corresponding to candidate predictive motion vectors included in a predetermined motion estimation range or search range, $R_{pmv}$ is a measurement function of the amount of bits needed to encode candidate predictive motion vectors pmv, included a predetermined candidate predictive motion vector set or candidate set, and A is a Lagrange multiplier. Therefore, as shown in Equation 1, with respect to P2N×2N mode of the current block, the present embodiment selects a differential motion vector dmv and a predictive motion vector pmv which minimize rate-distortion optimization function J and calculates the rate-distortion cost. Thereafter, it is checked whether the current block can be determined early as assuming SKIP mode based on a predetermined condition (S502). When the current block satisfies the conditions positively corresponding to the SKIP mode, the embodiment forgoes the process of rate-distortion cost calculation with respect to all other prediction modes than the SKIP mode to determine the SKIP mode as the optimal mode of the current block (S503). When the current block does not satisfy the same conditions failing to correspond to the SKIP mode, the embodiment performs the rate-distortion cost calculations with respect to all prediction modes (S504-S507) and determines the mode with the lowest rate-distortion cost as the optimal mode of the current block (S508).

According to some embodiments of the present disclosure, the predetermined conditions are (a) the block sizes for motion prediction and compensation being 2N×2N and (b) all-zero coefficients resulting from transforming and quantizing the residual data block between the predetermined input block and the prediction block.

The first mode is SKIP mode for transmitting or storing only the coding mode information of the input block. Different from the known SKIP mode that normally transmits or stores only the coding mode information of the input block, the present disclosure in some embodiments has temporally and spatially adjacent multiple neighboring blocks' motion parameters (motion vector and reference picture index) to select the optimal predictive motion parameter, and therefore, it further stores or transmits to the video decoding apparatus, predictive motion vector index information for identifying multiple candidate predictive motion vectors.

Figure 6:
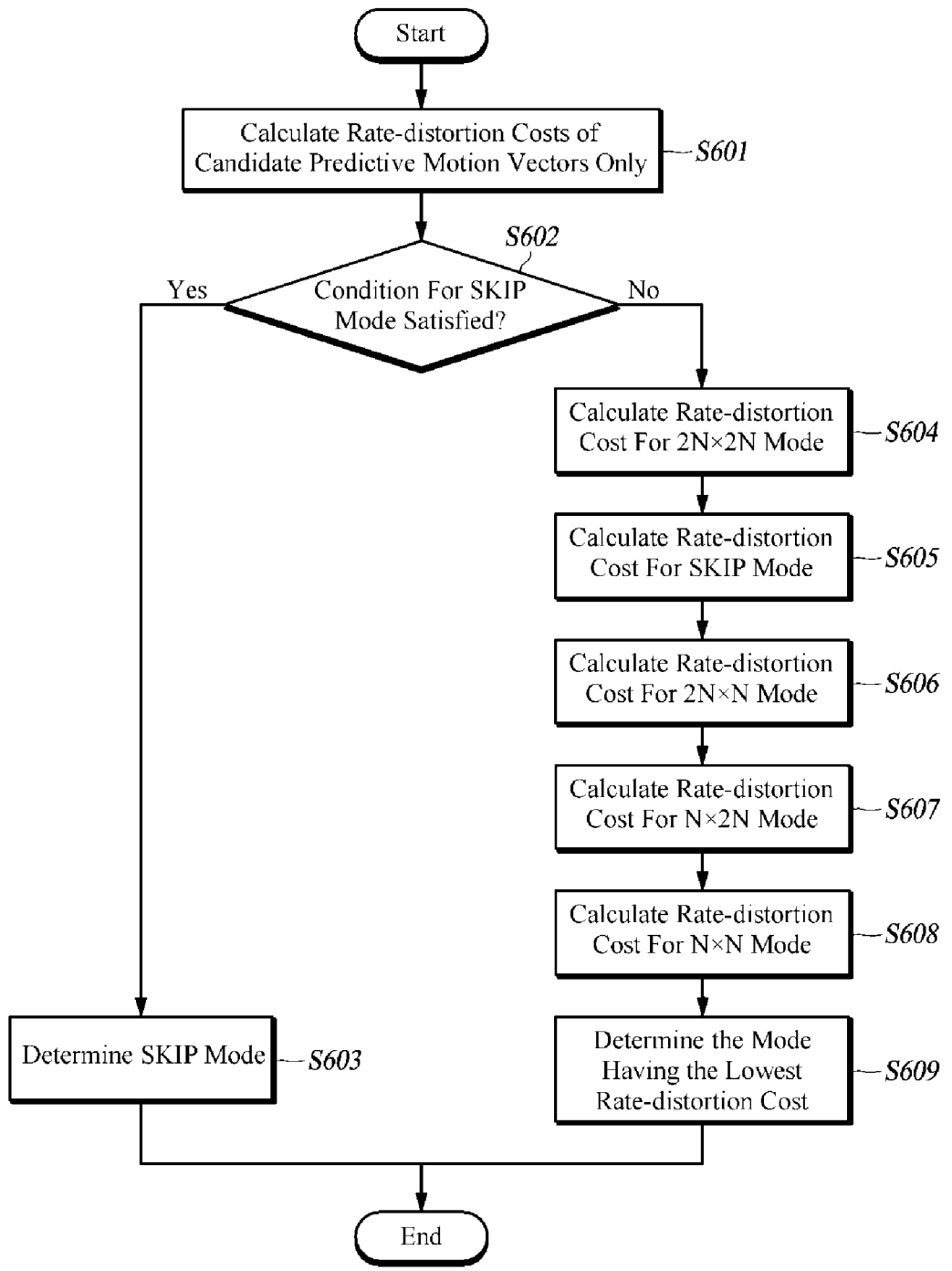
FIG. 6 is a flowchart of a fast mode decision method according to another embodiment.

FIG. 6 is a flowchart showing the fast mode decision method in accordance with at least another embodiment of the present disclosure.

As shown in FIG. 6, upon receiving 2N×2N form of the current block, inter prediction unit 420 checks for the possible early determination of the current block as assuming SKIP mode by forgoing the overall motion predictions against P2N×2N mode but applying the rate-distortion optimization process only to the multiple candidate predictive motion vectors, respectively. Here, the candidate predictive motion vectors refer to the motion vectors of spatial and temporal neighbor blocks wherein the spatial neighbor blocks are blocks adjacent to the current block and the temporal neighbor blocks are blocks in the previous picture at locations similar to that of the current block. The blocks similarly located to the current block mean either co-located blocks or near co-located blocks of the current block. Further, the candidate predictive motion vectors are not limited thereto, and various other blocks are used depending on embodiments.

With the candidate predictive motion parameters used as they are for motion estimation, the present embodiment assumes the differential motion vector to be (0, 0). Accordingly, the embodiment uses each of the candidate predictive motion parameters to perform the motion estimation and applies the rate-distortion optimization process to determining the optimal one of the predictive motion parameters and using thereof to calculate the rate-distortion cost (S601). Thereafter, optimal mode determining unit 430 checks whether the current block can be determined early as assuming SKIP mode based on predetermined conditions (S602). Based on the initial assumption of the differential motion vector to be (0, 0), this embodiment has just two conditions to verify. Specifically, this embodiment is suffice to check for satisfied conditions of (a) 2N×2N being the form of encoding performed and (b) all-zero coefficients resulting from transform and quantization of the residual data block between the predetermined input block and the prediction block which is generated by using select motion parameter generated from motion compensation with a select motion parameter of a selected one of candidate neighboring blocks.

When the current block satisfies the conditions positively corresponding to the SKIP mode, optimal mode determining unit 430 forgoes the process of rate-distortion cost calculation with respect to all other prediction modes than the SKIP mode to determine it as the optimal mode of the current block (S603). When the current block does not satisfy the same conditions failing to correspond to the SKIP mode, optimal mode determining unit 430 performs the rate-distortion cost calculations with respect to all prediction modes (S604-S608) and determines the mode with the lowest rate-distortion cost as the optimal mode of the current block (S609).

Subtractor 370 subtracts the predicted block from the current block for generating a residual block.

Residual data encoder 320 performs transform and quantization on the residual data block for generating transformed and quantized residual data block. In this case, the transform uses various schemes for transforming spatial domain signals to frequency domain signals such as Hadamard transform, discrete cosine transform, etc. The quantization uses various quantization techniques including uniform quantization with dead zone inclusive, quantization matrix, etc. In this case, the applicable size as well as shape of the transform block subject to the transform and quantization varies within a range not exceeding the size of the current block inputted. For example, assuming the size of the current block is a 2N×2N and the predicted block is of N×N, the available transform blocks for use are in units including 2N×2N, 2N×N, N×2N, N×N, N×N/2, N/2×N and N/2×N/2 not exceeding the 2N×2N unit. The size of the transform block is also selected by a rate-distortion optimization criterion. In other words, a variety of sizes as well as shapes of the transform block subject to the transform and quantization are selected by a predetermined criterion within a range not exceeding the size of the current block inputted.

Residual data decoder 330 performs an inverse quantization and an inverse transform on the transformed and quantization residual block from residual data encoder 320 to reconstruct the residual block. The inverse quantization and inverse transform can be configured in various ways by reversing the quantization and transform processes by residual data encoder 320. For example, residual data encoder 320 and residual data decoder 330 do not have to use their shared processes of transform and inverse transform or quantization and inverse transform. Instead, residual data decoder 330 performs the inverse quantization and inverse transform by inversely performing the quantization and transform processes of residual data encoder 320 with the use of transform and quantization process information (e.g. data of transform size, transform shape, quantization type and the like) generated and delivered by the transform and quantization processes of residual data encoder 320. By combining the residual block output through residual data decoder 330 and predicted values reconstructed through prediction unit 310, a reconstructed video is generated.

Entropy encoder 340 performs entropy encoding on the residual data block from residual data encoder 320 to output the entropy encoded residual data block. Though not shown in the presented embodiments, if needed, entropy encoder 340 encodes not only the residual data block but also various information required for decoding the encoded bitstream. The various information mentioned as required here refers to information on block types, intra prediction mode as set for the prediction, inter prediction mode as set for the prediction and transform and quantization types among others.

Further, the entropy encoding method used by entropy encoder 340 includes context-adaptive variable length coding, context-adaptive binary arithmetic coding and various other methods.

Encoded data generator 350 aligns and bitstreams the entropy encoded residual data, macroblock mode and encoded prediction information which is information on intra prediction mode in case of intra encoding, and motion vector, candidate motion vector index, reference picture index and the like in case of inter encoding.

Filter unit 360 filters the reconstructed current block order to reduce the influence of the distortion generated by the prediction and the quantization. According to an exemplary embodiment of the present disclosure, filter unit 360 can perform adaptive filtering by using block based prediction related information or transform and quantization related information transmitted along with the reconstructed current block, wherein the prediction related information refers to information on, for example intra prediction mode in case of intra encoding and reference picture index and motion vector in case of inter encoding, and the transform and quantization related information refers to information on, for example transformed block's size and shape, quantization parameter and the like. In this case, prediction related or quantization related information is passed directly to filter unit 360 of the encoding apparatus, or bitstreamed by encoded data generator 350 and delivered to a decoding apparatus. Further, filter unit 360 compensates the difference between the input current block and the reconstructed current block to minimize the effects of distortion caused by the prediction quantization, allowing the corresponding difference to be bitstreamed and transferred by encoded data generator 350 to the decoding apparatus.

Adder 380 adds the residual block reconstructed by residual data encoder 330 and the predicted block generated by prediction unit 310 to reconstruct the current block.

Figure 7:
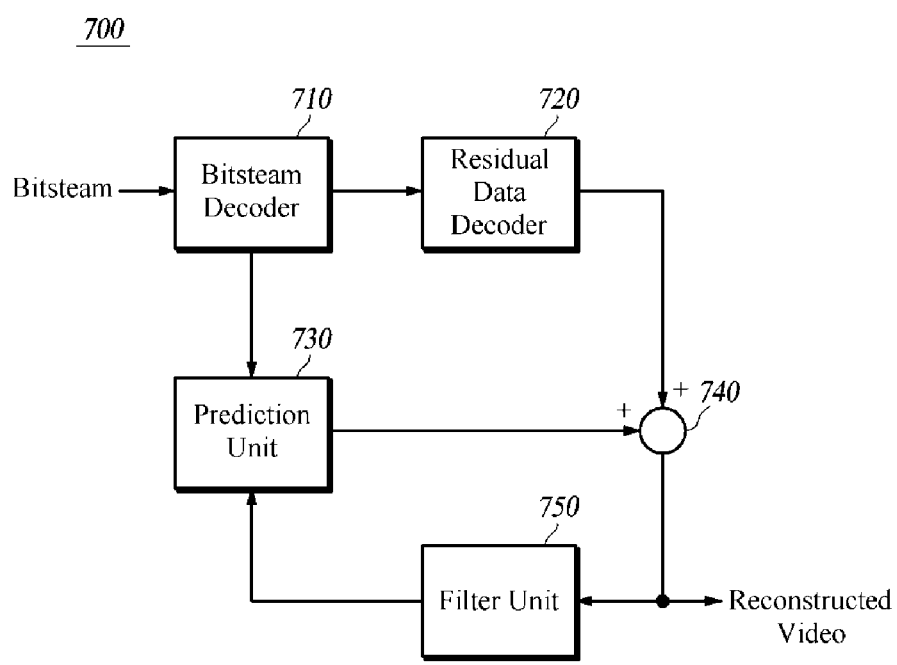
FIG. 7 is a block diagram of a video decoding apparatus according to at least one embodiment.

FIG. 7 is a block diagram showing a video decoding apparatus 700 according to at least one exemplary embodiment of the present disclosure.

Video decoding apparatus 700 in this example includes a bitstream decoder 710, a residual data decoder 720, a prediction unit 730, an adder 740 and a filter 750.

Bitstream decoder 710 performs decoding on a bitstream to decode or extract not only quantized frequency transformed blocks but also information required for the decoding. The required information for decoding refers to information required to decode an encoded bit string within encoded data (i.e. bitstream) and the same information includes, for example size information of coding unit (CU), prediction unit (PU), transform unit (TU), information on coded block pattern (cbp) and coded block flag (cbf), information needed for prediction, motion vector related information, information on transform and quantization types and various other information.

In other words, bitstream decoder 710 decodes the encoded data bitstream from video encoding apparatus 300, extracts therefrom information required for the prediction and quantized frequency transformed block including current block pixel information of a video, and delivers the extracted information required for the prediction to prediction unit 730.

Prediction unit 730 can predict the current block in the same manner as prediction unit 310 of video encoding apparatus 300 by using information necessary for the prediction delivered from bitstream decoder 710.

Residual data decoder 720 performs inverse quantization and inverse transform on the quantized frequency transformed block extracted from the bitstream by bitstream decoder 710 to reconstruct a residual block.

Adder 740 adds the reconstructed residual signal from residual data decoder 720 and the predicted pixel values generated by prediction unit 730 to reconstruct the original pixel values of the current block. When the prediction mode is SKIP mode, it is not necessary for Adder 740 add the predicted pixel values generated by prediction unit to the reconstructed residual signal because there is not residual signal when the prediction mode is SKIP mode.

With respect to the reconstructed current block, filter 750 performs the same operations as video encoding apparatus 300 does on its reconstructed current block.

Meanwhile, bitstream decoder 710 checks for whether SKIP mode is the prediction mode of the extracted information for prediction, which has been provided by extracting information on the prediction mode from the bitstream. If it is, prediction unit 730 reconstructs, as the current block, a block that is indicated by the motion parameter generated from extracted motion parameter identification information. The reconstructed current block by the prediction unit 730 is used as the current block without adding to the reconstructed residual signal from the residual signal decoder 720.

When the prediction mode is not the SKIP mode, prediction unit 730 predict the current block by generating a predicted block based on the extracted prediction mode information.

A video encoding/decoding apparatus according to an embodiment of the present disclosure are made by connecting the bitstream output terminal of video encoding apparatus 300 of FIG. 3 to the bitstream input terminal of video decoding apparatus 700 of FIG. 7.

The video encoding/decoding apparatus comprise a video encoder and a video decoder. The video encoder is configured to perform a predictive encoding on a current block with a predetermined size and a prediction mode set as a SKIP mode (a) when a motion estimation performed on the current block results in that a motion vector and reference picture index of the current block are respectively identical to a motion vector and reference picture index of a block of candidate blocks and that all-zero coefficients result from a transform and a quantization performed on a residual data block representing the difference between the current block and a predicted block or (b) upon a motion compensation performed by using a single motion parameter of a block from candidate blocks composed of neighboring blocks of the current block and when all-zero coefficients result from a transform and a quantization performed on a residual data block representing the difference between the current block and a predicted block. The video decoder is configured to extract prediction mode information from a bitstream, and when the extracted prediction mode information is a SKIP mode, reconstructs, as current block, a block that is indicated by a motion parameter generated from extracting motion parameter identification information.

In here, the video encoder is implemented by video encoding apparatus 300 according to an exemplary embodiment of the present disclosure, and the video decoder is implemented by video decoding apparatus 700 according to an exemplary embodiment of the present disclosure.

A video encoding method according to some embodiments of the present disclosure comprises performing predictive encoding on a current block with a predetermined size and a prediction mode set as a SKIP mode when a motion estimation performed on the current block results in that a motion vector and reference picture index of the current block are respectively identical to a motion vector and reference picture index of a block of candidate blocks and that all-zero coefficients result from a transform and a quantization performed on a residual data block representing the difference between the current block and a predicted block.

Here, when the all-zero coefficients result from the transform and the quantization performed on the residual data block representing the difference between the current block and a predicted block, the video encoding method according to some embodiments of the present disclosure forgos processes for comparing between encoding costs of prediction modes other than the SKIP mode and performs the predictive encoding on the current block with the prediction mode set as the SKIP mode.

Another video encoding method according to some embodiments of the present disclosure comprises performing a predictive encoding process upon a motion compensation performed by using a single motion parameter of a block from candidate blocks composed of neighboring blocks of a current block of a predetermined size and when all-zero coefficients result from a transform and a quantization performed on a residual data block representing the difference between the current block and a predicted block, for predictively encoding the current block with a prediction mode set as a SKIP mode by using the single motion parameter.

Here, when the all-zero coefficients result from the transform and the quantization performed on the residual data block representing the difference between the current block and the predicted block, the another video encoding method according to some embodiments of the present disclosure performs the predictive encoding on the current block with the SKIP mode by using the single motion parameter.

The video encoding method described here corresponds to the operation of video encoding apparatus 300 and therefore a detailed description thereof will be omitted.

A video decoding method according to some embodiments of the present disclosure comprises extracting prediction mode information from a bitstream; when the extracted prediction mode information is a SKIP mode, reconstructing, as current block, a block that is indicated by a motion parameter generated from extracting motion parameter identification information; and when the extracted prediction mode information is not the SKIP mode, predictively encoding the current block by generating a predicted block based on the extracted prediction mode information.

The video decoding method described here corresponds to the operation of video decoding apparatus 700 and therefore a detailed description thereof will be omitted.

A video encoding/decoding method according to an embodiment of the present disclosure are implemented by combining the video encoding method according to some embodiments and the video decoding method according to some embodiments.

The video encoding/decoding method comprise a video encoding process and a video decoding process. The video encoding process comprises performing a predictive encoding on a current block with a predetermined size and a prediction mode set as a SKIP mode when either (a) a motion estimation performed on the current block results in that a motion vector and reference picture index of the current block are respectively identical to a motion vector and reference picture index of a block of candidate blocks and that all-zero coefficients result from a transform and a quantization performed on a residual data block representing the difference between the current block and a predicted block or (b) upon a motion compensation performed by using a single motion parameter of a block from candidate blocks composed of neighboring blocks of the current block and when all-zero coefficients result from a transform and a quantization performed on a residual data block representing the difference between the current block and a predicted block. The video decoding process comprises extracting prediction mode information from a bitstream, and when the extracted prediction mode information is a SKIP mode, reconstructing, as current block, a block that is indicated by a motion parameter generated from extracting motion parameter identification information.

According to the present disclosure in some embodiments as described above, a video is encoded and decoded more effectively with SKIP coding mode determined during the video coding process to reduce the complexity of the coding without degrading the coding efficiency. Therefore, the present disclosure has been made for encoding and decoding a video more effectively with a coding mode quickly determined during the video coding process. In the description above, although all of the components of the embodiments of the present disclosure have been explained as assembled or operatively connected as a unit, one of ordinary skill would understand the present disclosure is not limited to such embodiments. Rather, within some embodiments of the present disclosure, the respective components are selectively and operatively combined in any number of ways. Every one of the components are capable of being implemented alone in hardware or combined in part or as a whole and implemented in a computer program having program modules residing in computer readable media and causing a processor or microprocessor to execute functions of the hardware equivalents. Codes or code segments to constitute such a program are understood by a person skilled in the art. The computer program is stored in a non-transitory computer readable medium, which in operation realizes the embodiments of the present disclosure. The computer readable medium includes a magnetic recording medium and/or an optical recording medium, in some embodiments.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

The invention claimed is:

1. A video encoding method performed by a video encoding apparatus for encoding a 2N×2N current block in a current picture by selecting a prediction mode among a plurality of prediction modes including a SKIP mode, an inter prediction mode and an intra prediction mode, the method comprising:

configuring, from pre-encoded blocks, a plurality of candidate blocks for selecting a motion vector and a reference picture index of the current block in the SKIP mode, the pre-encoded blocks including spatially-neighboring blocks which are adjacent to the current block in the current picture and a temporally-neighboring block, wherein the temporally-neighboring block is a co-located block in a pre-encoded reference picture or a block adjacent to the co-located block;

performing motion prediction on 2N×2N partition type of the current block and determining a motion vector and a reference picture for the current block by calculating rate- distortion cost for the current block;

determining, by using the plurality of candidate blocks, whether a prediction mode of the current block is the SKIP mode, and encoding, into a bitstream, a first mode information indicating whether the prediction mode of the current block is set as the SKIP mode, wherein the prediction mode of the current block is set as the SKIP mode when:

(i) there exists a candidate block that has the same motion vector and reference picture index as the current block among the plurality of candidate blocks including the spatially- neighboring blocks and the temporally-neighboring block and (ii) all-zero coefficients result from a transform and a quantization performed on a residual data block representing the difference between the current block and a predicted block generated based on the same motion vector and reference picture index as the current block, wherein the SKIP mode is a mode where no more information of the current block including information on residual signals is encoded into the bitstream except candidate block index information of the current block after the first mode information is encoded into the bitstream, and wherein the candidate block index information is dedicated to the current block, and is an index which is entropy-encoded into the bitstream for indicating a single candidate block among the plurality of candidate blocks, not the motion vector and the reference picture index themselves of the current block;

when the prediction mode of the current block is set as the SKIP mode, entropy-encoding, into the bitstream, only the candidate block index information indicating the candidate block that has the same motion parameter as the current block among the plurality of candidate blocks such that a video decoding apparatus identifies a single candidate block indicated by the candidate block index information extracted and decoded from the bitstream, and sets a motion vector and a reference picture index of the current block into a motion vector and a reference picture index of the identified single candidate block, and terminating the encoding of the current block using the other prediction modes, and reconstructing, as the current block, a block itself that is indicated by the set motion vector in a reference picture indicated by the set reference picture index; and when the prediction mode of the current block is not set as the SKIP mode, determining whether the prediction mode of the current block is the inter prediction mode or the intra prediction mode and a partition type in which the current block is partitioned into one or more prediction units among a plurality of partition types including 2N×2N, 2N×N, N×2N and N×N, wherein a prediction mode and a partition type having the lowest rate-distortion cost is determined as the prediction mode and the partition type of the current block, encoding, into the bitstream, prediction information including the determined prediction mode and partition type, and information on residual data that is difference between the current block and a predicted block generated based on the prediction information, and reconstructing the current block by adding the residual data to a predicted block generated by the prediction information.

2. The video encoding method of claim 1, wherein a size of the current block is a coding unit.

3. The video encoding method of claim 1, wherein when the all-zero coefficients result from the transform and the quantization performed on the residual data block, the optimal mode determining unit is configured to set the prediction mode of the current block as the SKIP mode without comparing costs of encoding the current block for other prediction modes.

4. A video decoding method performed by a video decoding apparatus for decoding a 2N×2N current block in a current picture by selecting a prediction mode among a plurality of prediction modes including a SKIP mode, an inter prediction mode and an intra prediction mode, the method comprising:

extracting a first mode information indicating whether a prediction mode of the current block to be decoded is the SKIP mode from a bitstream, wherein the SKIP mode is a mode where no more information of the current block including information on residual signals is encoded into the bitstream except candidate block index information of the current block after the first mode information is encoded into the bitstream, wherein the SKIP mode is allowed only for a 2N×2N type before the current block is partitioned, and is not allowed for the other types including 2N×N, N×2N, and N×N types after the current block is partitioned into two or more prediction units, and wherein the candidate block index information is dedicated to the current block, and is an index which is entropy-encoded into the bitstream for indicating a single candidate block among a plurality of candidate blocks which are constructed from pre-decoded blocks including a plurality of spatially-neighboring blocks which are adjacent to the current block in a current picture and a temporally-neighboring block, not the motion vector and the reference picture index themselves of the current block, wherein the temporally-neighboring block is a co-located block in a reference picture or a block adjacent to the co-located block;

when the extracted first mode information is not indicative of the SKIP mode, extracting either inter prediction information or intra prediction information, and information on residual signals from the bitstream, wherein the inter prediction information includes motion vector information and reference picture index information of the current block and reconstructing the current block by using a predicted block generated based on the extracted inter or intra prediction information and a residual block generated based on the information on residual signals; and when the extracted first mode information is indicative of the SKIP mode, extracting from the bitstream and decoding only the candidate block index information which has been entropy-encoded into the bitstream, configuring the plurality of candidate blocks from the pre-decoded blocks including the plurality of spatially-neighboring blocks and the temporally-neighboring block, identifying a single candidate block indicated by the decoded candidate block index information among the plurality of candidate blocks and obtaining the motion vector and the reference picture index of the current block from a motion vector and a reference picture index which have been set for the identified single candidate block, and reconstructing, as the current block, a block itself that is indicated by the obtained motion vector in a reference picture indicated by the obtained reference picture index, without extracting residual signals from the bitstream and thereby without adding the extracted residual signals to the block that is indicated by the obtained motion vector.

5. The video decoding method of claim 4, wherein, when the extracted first mode information is not indicative of the SKIP mode, the extraction of either the inter prediction information or the intra prediction information comprises:

extracting, from the bitstream, a second mode information indicating whether the prediction mode of the current block is the inter prediction mode or the intra prediction mode; and extracting information on a prediction unit from the bitstream, the information on the prediction unit indicating a partition type in which the current block is partitioned into one or more prediction units; and extracting either the inter prediction information or the intra prediction information corresponding to each of the prediction units, based on the second mode information and the information on the prediction unit.

* * * * *